United States Patent
Nyman et al.

(10) Patent No.: US 6,855,262 B2
(45) Date of Patent: Feb. 15, 2005

(54) METHOD AND APPARATUS FOR CLARIFYING AND/OR THICKENING A SLURRY

(75) Inventors: Bror Nyman, Vanha-Ulvila (FI); Matti Nuorala, Tornio (FI)

(73) Assignee: Outokumpu Oyj, Espoo (FI)

( * ) Notice: Subject to any disclaimer, the term of this patent is extended or adjusted under 35 U.S.C. 154(b) by 25 days.

(21) Appl. No.: 10/481,298

(22) PCT Filed: Jun. 19, 2002

(86) PCT No.: PCT/FI02/00538

§ 371 (c)(1),
(2), (4) Date: Dec. 19, 2003

(87) PCT Pub. No.: WO03/000378

PCT Pub. Date: Jan. 3, 2003

(65) Prior Publication Data

US 2004/0168991 A1 Sep. 2, 2004

(30) Foreign Application Priority Data

Jun. 25, 2001 (FI) .......................................... 20011353

(51) Int. Cl.[7] .............................................. B01D 21/06
(52) U.S. Cl. ...................... 210/800; 210/519; 210/525; 210/528
(58) Field of Search ................................ 210/800–803, 210/519–520, 523–525, 528, 531

(56) References Cited

U.S. PATENT DOCUMENTS

| | | | |
|---|---|---|---|
| 2,106,549 A | 1/1938 | Coulter | 209/465 |
| 2,528,051 A | 10/1950 | Graner | 210/55 |
| 3,986,592 A | 10/1976 | Baillie et al. | 196/14.52 |
| 4,017,402 A | 4/1977 | Fitch | 210/528 |
| 4,592,845 A | 6/1986 | Lejeune et al. | 210/715 |
| 5,534,163 A | 7/1996 | Michel | 210/800 |

FOREIGN PATENT DOCUMENTS

JP 9-299713 11/1997 ........... B01D/21/18

Primary Examiner—Robert James Popovics
(74) Attorney, Agent, or Firm—Morgan & Finnegan, L.L.P.

(57) ABSTRACT

The invention relates to a method of clarifying and/or thickening a solution containing solids i.e. a slurry, and the apparatus for accomplishing this. Using the method and apparatus of the present invention, the slurry to be fed into the clarification or thickening apparatus is distributed evenly into the slurry already in the tank. It is characteristic of the clarification tank now developed that the displacement capacity of the raking system in the tank is the same from the edges of the tank up to the centre. The displacement capacity is measured as being the same as the underflow discharge capacity from the centre of the tank. The displacement capacity can be determined to be the same using rake displacement plates of different heights, according to the distance of the displacement plates from the rake shaft and the number of plates rotating on the same ring-like cross-section.

11 Claims, 3 Drawing Sheets

METHOD AND APPARATUS FOR CLARIFYING AND/OR THICKENING A SLURRY

Figure 1:
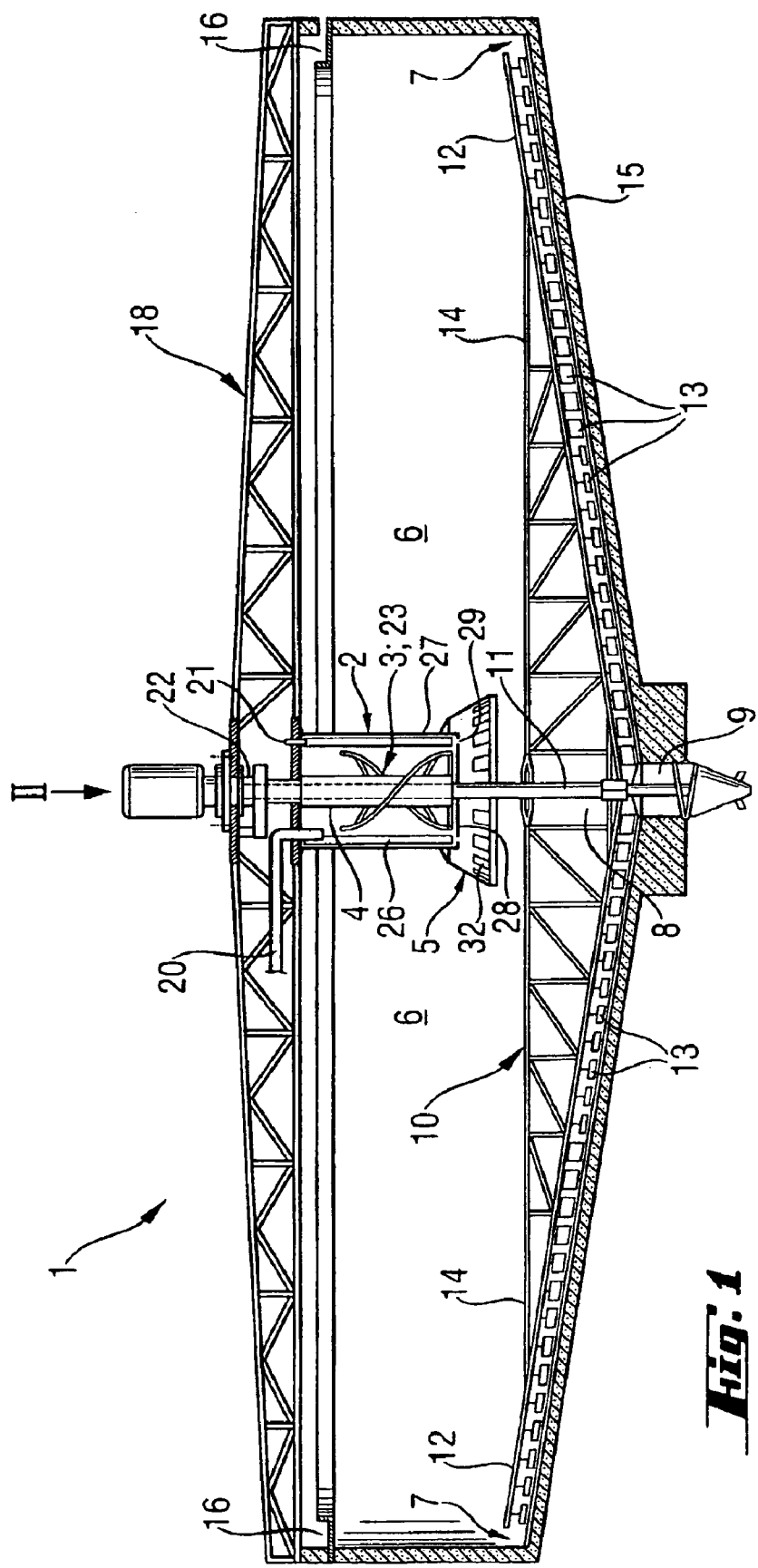

This invention relates to a method of clarifying and/or thickening a solution containing solids i.e. a slurry, and the apparatus for accomplishing this. Using the method and apparatus of the present invention, the slurry to be fed into the clarification or thickening apparatus is distributed evenly into the slurry already in the tank. It is characteristic of the clarification tank now developed that the displacement capacity of the raking system in the tank is the same from the edges of the tank up to the centre. The displacement capacity is measured as being the same as the underflow discharge capacity from the centre of the tank. The displacement capacity can be specified to be the same using rake displacement plates of different heights, according to the distance of the displacement plates from the rake shaft and the number of plates rotating on the same ring-like cross-section.

The clarifying and thickening apparatus comprises a tank, into which the slurry to be clarified is fed via a feedwell, which is located in the centre of the clarification tank, generally in its upper section. When the term clarification is used later in the specification of the invention, it is used however to refer also to thickening, since the methods and apparatus described can usually be applied for both purposes. The diameter of the clarification tank is ten times larger than that of the feedwell. In addition to the slurry a flocculant used in clarification is fed into the feedwell. The flocculant is often mixed into the slurry while it is being fed into the feedwell. The clarification or thickening tank may be equipped with a rake operating near the bottom, or function without one.

The clarified liquid, or overflow, is removed from the clarification tank as an overflow and the thickened slurry, or underflow, is removed from the central part of the tank bottom, to where it has been moved by the rake arms. The bottom of a thickening tank is usually inclined, i.e. sloping down towards the centre, whereby the removal of solids is made easier. The number of arms in the rake can be varied depending on the design solution. Some of the rake arms may be the length of the tank radius, others may be shorter. Vertical plates are fixed to the rake arms, and they move the slurry from the edges towards the centre. They are fixed either perpendicularly to the rake arm or for example at an angle of 30 degrees to it.

When the mixing of the flocculant into the slurry occurs in the feedwell with only for instance the mixing achieved by a tangential feed, it is clear that the flocculant does not mix evenly and that the local shear forces become large. However, the flocculants used in the present day are large-molecule polymers whose action is hindered as shear forces increase. If the slurry to be transferred to the clarification tank from the feedwell is discharged there forcefully, there is a danger that it will be aimed basically upwards in the direction of the smallest pressure and thus be mixed into the separated, already clarified overflow in the upper section of the tank. The clarification or thickening tank rakes usually function so that they have an "overlarge" displacement capacity, whereby they press the thickened slurry to the centre of the tank, where a pile rises that is higher than the rest of the slurry.

A method and apparatus has now been developed to clarify and thicken a solution containing solids, in other words a slurry, where the capacity of the rake located in the clarification tank is dimensioned to be in principle the same magnitude from the edges of the tank to the central area. The slurry is fed into the actual thickener via a feedwell so that the slurry spreads outwards and downwards from the well. The thickener, which acts as a settling space, is equipped with a rake in the direction of the bottom, of which at least two of the displacement elements reach the edge of the cylindrical tank and at least two are clearly shorter. The invention is not however limited to this displacement element or rake arms solution. The height of the rake arm displacement plates can be varied so that the displacement capacity of each circle formed by the rake arm displacement plates is more or less the same up to the central area. In order to achieve this the height of the displacement plates in the apparatus according to the invention is dependent on the distance of the plate from the rake shaft and on the number of rake arms at the point in question. The displacement plates are preferably inclined vertically towards the rake shaft. The essential features of the invention will be made apparent in the attached claims.

The method of the present invention is especially applicable to cases where the aim is a clear overflow solution, completely separated from solids. The settled and removed underflow can be recirculated back to earlier process steps. Only the equivalent amount of accumulated underflow is taken away for instance via filtration. In this way the hydrodynamic behaviour of the settling space is increased. The method and apparatus have proven beneficial particularly in the treatment of sediment containing gypsum and metal hydroxide. The sediment is formed when the acidic and rinsing waters generated in steel pickling are neutralized with lime compounds.

According to the invention there is a feedwell inside the clarification or thickening apparatus, into which the solids-containing solution or slurry is fed. The slurry can be fed into the feedwell for instance from above, but nevertheless so that the slurry feed is gentle. The flocculant used is also fed into the feedwell. The feedwell is preferably an upright cylinder equipped with its own mixing element. The mixing element is preferably a helix-type mixer working on the principle described in U.S. Pat. No. 5,182,087, with a structure of two tubes circling around a shaft, making $\frac{1}{3}$–2 revolutions around the shaft. The mixing direction is rising. Thanks to the mixing element it is possible to mix the flocculant into the slurry evenly and the mixing is of very low and uniform intensity throughout the feedwell zone. Thus strong localized mixing can be avoided.

The diameter of the mixing element is 40–80% of that of the feedwell. The mixing element shaft is a hollow cylinder, with a diameter large enough so that the shaft of the clarification tank rake and also the coupling flange of the shaft fit through the mixing element shaft. The supports required by the helix tube are fixed at one end naturally to the tubes and at the other to the shaft casing of the mixing element. The feedwell can also be equipped with baffles, which are placed at equal intervals along the edge of the well. Some of the baffles are the height of the feedwell but preferably interspersed with baffles extending from the bottom upwards to a height of only about $\frac{1}{3}$ of the long baffles and the total height of the feedwell.

The slurry and the flocculant mixed into it are guided from the actual feedwell downward via openings situated at the lower edge of the feedwell, and always located between the baffles. The openings are in front of the baffles in relation to the rotation direction of the mixer. Thus the pressure pulses caused by the mixer at the point of baffles promote the even discharge of the slurry at each opening. The velocity of the outflow is preferably of the order of 0.05–0.2 m/s. Some of the slurry may also flow through the rake shaft socket.

From the feedwell the slurry flows to a guiding cone located below the feedwell, which extends into the upper part of the slurry layer in the clarification tank. The purpose of the guiding cone is to give a component of downward movement to the slurry entering the settling space, reducing the tendency of the slurry to curve upwards. In this way the slurry spreads evenly into the compacted sediment without mixing the overflow solution. The guiding cone, as its name suggests, is a downwardly widening cone, which is open on its inner side. The slurry from the feedwell is discharged through the openings in the lower part of the edges of the guiding cone into the clarification tank. The solid lower edge of the guide pushes down the compacted slurry, and the pressure differences in the tank cause the slurry to divide itself evenly among the various discharge ports. The guiding cone is situated in the clarification tank in the upper part of the slurry layer, which is still in the compaction stage. It has been shown that the preferable height of the lower section of the guiding cone is 0.5–0.7 times the depth of the solution and slurry in the centre of the tank.

In the settling space, in other words the clarification tank, the underflow, which has settled downwards and compacted at the same time, is moved from the edges of the cylindrical tank towards the centre of the tank using a rake system. If the tank is not cylindrical, the moving of the underflow that has settled in the corners of the tank to a circular boundary in the tank must be performed in a way known before. In the apparatus now developed the rake has two arms reaching the edges of the cylindrical tank and between them two arms that are only about half the length of the long arms. It is of course clear that the number of long arms and auxiliary arms can be varied within the framework of the invention without being limited to two long and two auxiliary arms. It is characteristic of the clarification tank solution now developed that the underflow displacement capacity is the same from the edges of the tank to the central area. The displacement capacity is measured as being the same as the underflow discharge capacity from the centre of the tank. The method enables the avoidance of overlarge displacement capacity, which result in a growing amount of compacted slurry in the centre of the clarifier, which rises up in piles. The surface of the compacted underflow is not allowed to rise as far as the feedwell guiding cone, and thus an uneven and channelised feed of slurry is avoided.

A uniform displacement capacity in the settling space is achieved so that the height of the underflow displacement plates attached to the rake arms varies. The displacement plates that are at the same distance from the rake shaft move the underflow from the ring-like area inwards. Since the cross-section of the ring-like area gets smaller from the perimeter of the tank as it goes inwards, in order to obtain the same displacement capacity the height of the displacement plates should be increased as the location of the plate gets closer to the rake shaft. Each displacement plate at the same distance from the shaft is at the same height. Thus the height of the outer displacement plates is lower than that of those nearer the centre. In the inner section of the settling space, where the shorter auxiliary arms are located between the long rake arms, the displacement capacity increases as the number of rake arms doubles, and in this way therefore the height of all the displacement plates can be left at the same order of magnitude as the height of the displacement plates at the tip of the rake arms. From here, the height of the displacement plates can again be gradually increased towards the centre. The height of the final displacement plates, those closest to the rake shaft, can be kept basically the same, which causes the underflow displacement capacity of the rake arms in the central zone to drop. The height of the displacement plates is kept the same for a distance that corresponds to 15–30% of the length of the tank-length rake arms. When operating in this way, the outer mass of underflow moving towards the centre takes part in moving the underflow in the centre towards the discharge ports. The pressing caused by the outward-moving underflow compacts the underflow even more and raises the solids content of the underflow to be removed.

In the way described above the method of the present invention can prevent the "overcapacity" of underflow displacement. When the power transmission of the rake is equipped with a frequency converter, the underflow displacement capacity can be specified to be more suitable for every situation by adjusting the operating speed of the rake. With the method now developed, the situation can be avoided where the over-displacement of the underflow results in a pile of underflow in the centre of the clarification tank. If a pile is formed, it may cause blocking of the underflow discharge ports and in addition, prevent the even distribution into the settling space of the slurry fed from the feedwell. This in turn results in disturbance of the clarification of the overflow, as mentioned previously.

Figure 2:
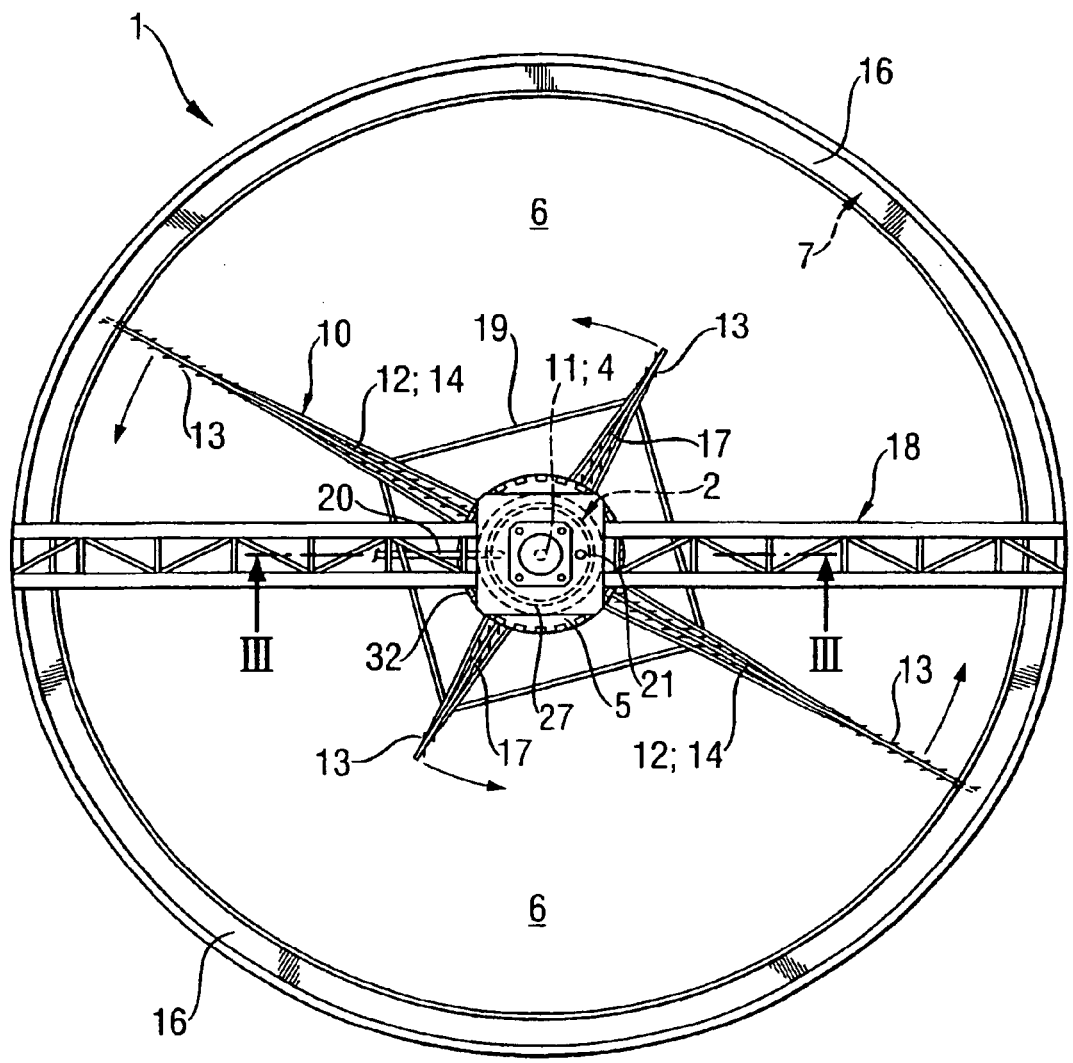
Figure 3:
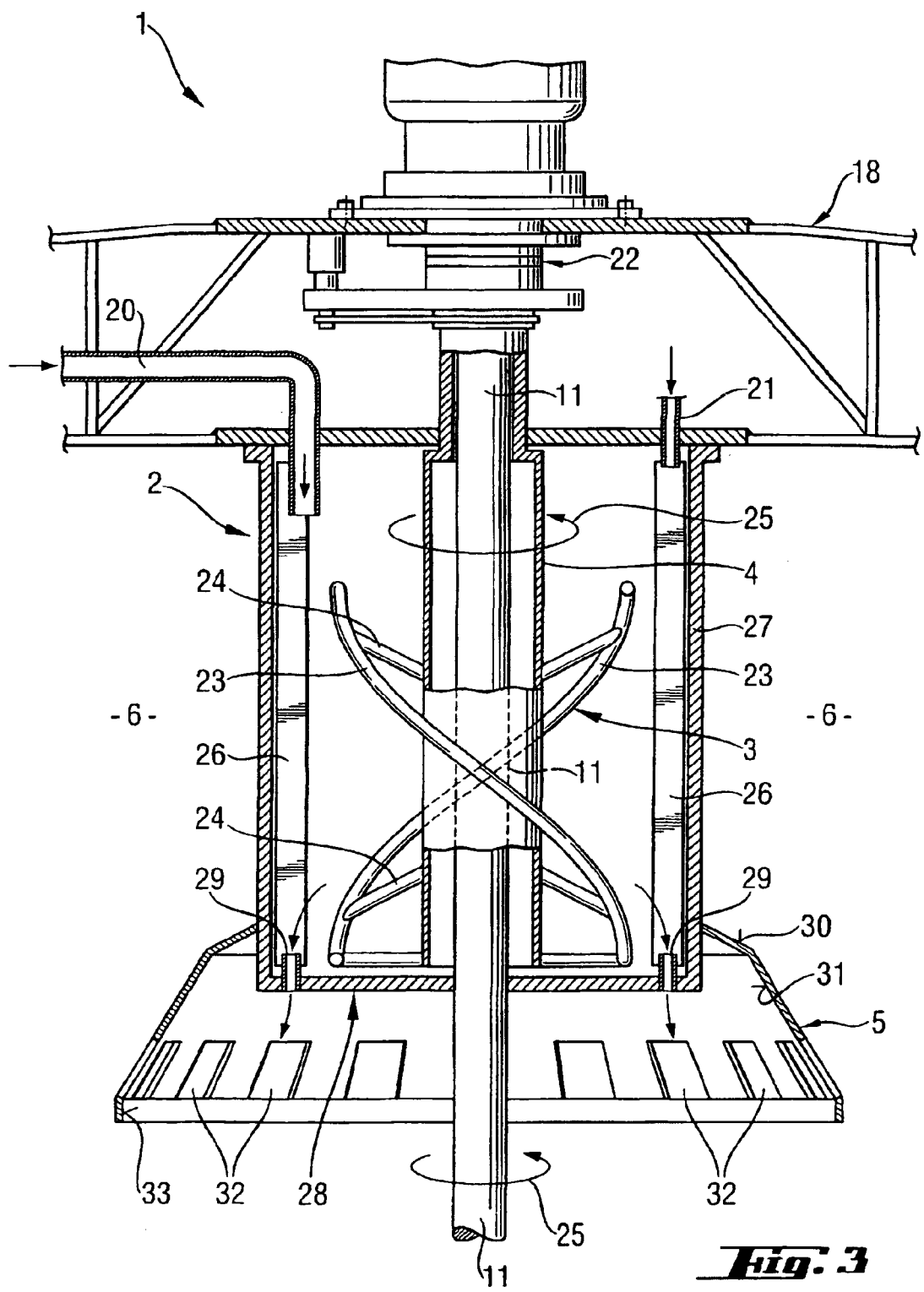

The method and apparatus according to the invention are described further by means of the attached drawings, where FIG. 1 is a vertical section of the whole clarification apparatus, FIG. 2 presents a clarification apparatus according to FIG. 1 as seen from above, and FIG. 3 shows a vertical section of a clarification tank feedwell according to the invention.

FIG. 1 shows a clarification apparatus 1, inside which is a feedwell 2, situated in the centre of its upper section. Inside the feedwell is located a slurry mixing element 3 on its shaft 4. A guiding cone 5 attached to the lower section of the feedwell is seen only partially. Settled underflow is moved into a cylindrical clarification tank 6 from the edges 7 towards an underflow cone 9 situated in the lower section of the central zone 8 of the tank by means of the rake 10. A shaft 11, on which the rake is hung, travels through the mixing element shaft 4. The power transmission of neither shaft is shown in detail. Below the rake arms 12 are the displacement plates 13, and the diagram also shows that the height of the displacement plates varies depending on their distance from the rake shaft and on the number of rake arms. The rake support structure 14 is above the rake. The central zone 8 is ring-like in shape and extends outwards from the rake shaft a distance of 15–30% the length of the long rake arms 12. The height of the displacement plates in the central zone can be considered standard. The rake arms are parallel with the bottom 15 of the clarification tank, in other words sloping down towards the rake shaft and centre of the tank. The clarification tank thus deepens towards the centre. The clarified overflow is removed from the upper section of the tank into its own discharge launder 16.

FIG. 2 presents the clarification apparatus of FIG. 1 as seen from above. This shows that the rake 10 is equipped in this case with two long rake arms 12 and with two shorter auxiliary arms 17 between them. The drawing shows one rake arm with a supporting beam 18 of the arms drive gear and the others without. The drawing also shows the rake supporting bars 19. The distance of the displacement plates 13 from each other is the same all along the rake arm. As shown in the drawing, the displacement plates are at an angle of about 30 degrees to the rake arm (in relation to the radius). The length of the displacement plates is the same all along the rake arm. The length (width) of the displacement plates is determined so that the tail end of the previous plate and the front end of the next plate overlap by 10–20%. The functional efficiency of the displacement plates is also improved by the fact that the plates are at a 5–25 degree angle to the vertical plane i.e. they are slightly inclined towards the rake shaft. As the rake rotates the underflow is displaced towards the centre by the ploughing effect of the displacement plates. In addition, as a result of the positioning of the displacement plates described above, the underflow also rises a little over the displacement plates. Thanks to this simple procedure the displacement plates do not compact the thin layer of underflow below the rake, but on the contrary, keep it loose thus preventing the rake from getting wedged stuck.

FIG. 3 presents in more detail the clarification tank feedwell 2, which is upright cylindric in shape. The slurry is fed into the well via a pipe 20, and the flocculant via another pipe 21. Both the slurry and the flocculant can be fed in a gentle stream into the feedwell, because they are mixed together inside the well by means of a mixing element 3. The drawing shows that the helix mixer shaft 4 is built as a socket so that both the mixing tank rake shaft 11 and also the coupling flange 22 of the rake shaft fit through it. The mixing element 3 is comprised of two tubes 23, which rotate around the shaft at ⅓–2 revolutions. The tubes 23 are supported on the shaft by means of support elements 24. The mixing direction 25 is rising. The diameter of the mixing element is 40–80% of the diameter of the feedwell.

The feedwell 2 is also equipped with baffles 26, which are located evenly on the outer edge 27 of the feedwell. Both the slurry and the flocculant are preferably guided into the feedwell nearby the baffles on the front side of the mixing. Some of the baffles are essentially the same height as the feedwell, but some, preferably every second one, are only ⅓ of the height of the feedwell. All the baffles are supported to rise upwards from the bottom of the feedwell 28. The baffles number from 12–24. Slurry discharge ports 29 are located in the bottom of the feedwell always between the baffles so that they are in front of the baffles in regard to the rotation direction of the mixing element. According to the feedwell of this invention, the flocculant is mixed into the slurry quickly, but when the residence time of the slurry in the feedwell is regulated between 3–15 minutes, the slurry is flocculated well before it is guided onwards.

Attached to the bottom of the feedwell is the guiding cone 5, which opens downward, and the feedwell discharge ports open into the inside of the guiding cone. The guiding cone is comprised of one or several conical surfaces and is preferably, although not necessarily, open inside. FIG. 3 shows two conical surfaces, of which the upper one 30 opens downwards at a 20–45 degree angle (from the horizontal). The upper conical surface is tightly fixed to the lower conical surface 31, which opens downwards at a 45–75 degree angle (from the horizontal). Located in the lower section of the guiding cone are the slurry guide ports 32. The ports number for example between 16–32 and the outflow of slurry from them can be adjusted within the range of 0.05–0.2 m/s. The lower edge 33 of the guiding cone is whole and preferably vertical. The purpose of the guiding cone is to prevent the slurry being fed into the clarification tank from flowing strongly towards the surface of the underflow layer, which would jeopardise the clarity of the overflow solution. The guiding cone can be dimensioned so that the diameter of its lower edge is 1.3–2 times larger than the diameter of the feedwell. When the guiding cone is formed of several conical surfaces, the steepest conical surface preferably accounts for 55–70% of the total height of the whole guiding cone.

The invention is described further by means of the following examples.

EXAMPLE 1

It was desired to obtain an even displacement of underflow in an industrial scale thickener developed from the perimeter of the cylindrical tank towards the underflow well in the centre. The diameter of the thickener was 27 m and the amount of underflow to be moved to the well was 40 m$^3$/h. An operating speed of 0.075 rpm was chosen for the rake system. The attached Table 1 shows how the height of the displacement plates increases first from the outer perimeter up to the auxiliary rake arms, where the height of the plates decreases, because their number is doubled. After the minimum point at the tip of the auxiliary rake arms, the height of the displacement plates again increases towards the centre. The last displacement plates, those closest to the centre are the same height as each other, so the outward raking pressure compacts the underflow even more.

TABLE 1

| Numbering of displacement plates from edge of tank towards centre | | Height of displacement plates mm | Displacement capacity of plates on same circumference m$^3$/h |
|---|---|---|---|
| Main rake arms | Auxiliary rake arms | | |
| 1, 2 | | 120 | 43.6 |
| 2, 3 | | 125 | 43.6 |
| 3, 4 | | 130 | 43.8 |
| 4, 5 | | 135 | 43.7 |
| 5, 6 | | 140 | 43.3 |
| 6, 7 | | 148 | 43.8 |
| 7, 8 | | 156 | 44.1 |
| 8, 9 | | 164 | 44.2 |
| 9, 10 | | 172 | 44.0 |
| 10, 11 | | 180 | 43.7 |
| 11, 12 | | 190 | 43.7 |
| 12, 13 | | 200 | 43.2 |
| 13, 14 | | 210 | 42.6 |
| 14, 15 | | 220 | 41.7 |
| 15, 16 | 1, 2 | 130 | 45.8 |
| 16, 17 | 2, 3 | 145 | 47.2 |
| 17, 18 | 3, 4 | 160 | 47.8 |
| 18, 19 | 4, 5 | 175 | 47.6 |
| 19, 20 | 5, 6 | 190 | 46.6 |
| 20, 21 | 6, 7 | 205 | 44.8 |
| 21, 22 | 7, 8 | 220 | 42.2 |
| 22, 23 | 8, 9 | 220 | 36.3 |
| 23, 24 | 9, 10 | 220 | 30.5 |
| 24, 25 | 10, 11 | 220 | 24.5 |
| 25, 26 | 11, 12 | 220 | 18.7 |
| 26, 27 | 12, 13 | 220 | 17.4 |

EXAMPLE 2

A settling test showed that the slurry is distributed evenly in a thickener according to the invention. The slurry used in the tests was an industrial-scale thickener underflow, which had been obtained by neutralising the waters containing iron(III), chrome(III) and nickel(II) and sulphate generated in refined steel pickling. 52% of the solids in the slurry were gypsum and the rest metal hydroxides. The diameter of the test thickener was 1100 mm and the effective depth of the cylinder section 340 mm. The conical bottom inclined at an angle of 9.5° towards the centre. The rake was in principle according to that described in example 1. The diameter of the feedwell of the thickener was 172 mm and the effective depth 315 mm. The baffles and guiding cone were as described in the preamble. The feedwell mixer was a helix-type i.e. including two tubes around the shaft rising one revolution in the mixing direction, and at a constant distance from the shaft. The diameter of the mixer was 110 mm and the depth 252 mm.

The underflow previously settled in the settling tests was pumped back into circulation via the thickener feedwell. Water was also fed into the feedwell in the proportion of three parts to one part underflow. Water separated in the thickener was removed as thickener overflow. The feed of underflow and water was increased in proportion and then lowered in the same ratio to determine the separation capacity and separation efficiency of the thickener. At first a flocculant was not used, so that the performance characteristic of the thickener was largely dependent on how evenly the slurry flowed out of the feedwell when it was first mixed. In the test, the speed of revolution of the mixer was 127 rpm and that of the rake 0.4 rpm. In the final stages of the test the clear separated water layer developed as follows:

TABLE 2

| Time min | Water feed l/h | Underflow feed l/h | Water layer Mm |
|---|---|---|---|
| 00 | 142 | 45 | 119 |
| 15 | 144 | 45 | 94 |
| 114 | 131 | 36 | 87 |
| 170 | 131 | 35 | 75 |
| 195 | 101 | 35 | 82 |

According to the results described above, the maximum feed of the test thickener can be determined as about 120 l/h water and 40 l/h underflow. The input flows can be raised surprisingly high, when taking into account the settling properties and the fact that no flocculant was used in the test. The water layer that separated out was completely clear, which also indicates that the mixer used in the feedwell evens out the thickener feed. The conventional thickener, from whence the underflow used in the test came, was not able to achieve the same performance, since the separated overflow remained cloudy.

EXAMPLE 3

The test in example 2 was carried out using the flocculant Fennopol A305, which was dosed as a 0.5 g/l-solution of 136 mg/kg solids. The overflow layer was in the order of 100 mm and completely clear, when the feed was 360 l/h water and 120 l/h underflow. The feedwell mixer was thus able to mix the water, underflow and flocculant homogeneously and distribute it evenly into the slurry layer of the thickener.

What is claimed is:

1. A method for clarifying and/or thickening a solution containing solids, comprising feeding a slurry via a feedwell into a settling space for clarification, removing the settled solids or underflow via a discharge port in the center of the settling space and removing the clarified solution or overflow as an overflow, and displacing the underflow from the edges of the space towards the center via a rake in the settling space rotating on its shaft with displacement elements on said rake radially to the tank, moving the underflow via displacement element displacement plates at the same distance from the shaft as they rotate from a ring-shaped cross-section towards the center, the displacement capacity of the underflow displacement elements on concentric ring-like cross-sections being basically the same from the edges of the settling space to the central area and the displacement capacity on the innermost concentric ring-like cross-sections of the central area being smaller than on the other cross-sections.

2. A method according to claim 1, wherein the underflow displacement occurs using displacement plates attached to the displacement elements, forming an angle of about 30 degrees in relation to the displacement elements and tank radius.

3. A method according to claim 1, wherein the central area extending from the rake shaft a distance of 15–30% of the length of the settling space-length rake, has a smaller displacement capacity than the outer ring-like cross-sections.

4. An apparatus for clarifying and/or thickening a solids-containing solution, whereby the apparatus comprises a clarification and/or settling tank, which is equipped with a feedwell for the slurry to be settled, discharge ports for the settled solids or underflow in the centre of the settling space, a discharge launder for the clarified solution or overflow, and a rake rotating on its shaft, which moves the underflow from the edges of the tank to the center, where said rake has at least two arms reaching the edge of the tank in a radial direction, in order to keep the underflow displacement capacity constant from the edges of the clarification and/or thickening tank to the centre, there are displacement plates attached to the rake arms, with a height dependent on the distance of the displacement plate from the rake shaft and the number of rake arms, and the height of the displacement plates in the central area, which is ring-like in shape and reaches from the rake shaft outwards for a distance of 15–30% of the length of the long rake arms, is kept basically the same.

5. An apparatus according to claim 4, wherein the height of the rake arm displacement plates increases from the edge of the tank towards the rake shaft as far as the central area.

6. An apparatus according to claim 4, wherein the rake is equipped with at least two auxiliary arms, the length of which is about half the length of the arms reaching the edge of the tank.

7. An apparatus according to claim 6, wherein the height of the rake arm displacement plates increases from the edge of the tank towards the rake shaft as far as the tip of the auxiliary arm.

8. An apparatus according to claim 6, wherein the height of all the rake arm displacement plates increases from the tip of the auxiliary arms as far as the central area.

9. An apparatus according to claim 4, wherein the displacement plates are attached to the rake arms at an angle of about 30 degrees in relation to the longitudinal direction of the arm and the tank radius.

10. An apparatus according to claim 4, wherein the displacement plates are inclined forwards at an angle of 5 . 25 degrees in relation to the vertical axis.

11. An apparatus according to claim 4, wherein each of the displacement plates at the same distance from the rake shaft are the same height.

* * * * *